United States Patent
Slavin et al.

(10) Patent No.: US 10,410,236 B2
(45) Date of Patent: Sep. 10, 2019

(54) METHOD AND SYSTEM FOR DELIVERING OFFERS TO USERS OF ELECTRONIC PRIVILEGE CARDS

(71) Applicant: Codebroker LLC, Belmont, MA (US)

(72) Inventors: Daniel Slavin, Belmont, MA (US); Pero Smrzlic, Leesburg, VA (US)

(73) Assignee: Codebroker, LLC, Belmont, MA (US)

( * ) Notice: Subject to any disclaimer, the term of this patent is extended or adjusted under 35 U.S.C. 154(b) by 532 days.

(21) Appl. No.: 15/298,579

(22) Filed: Oct. 20, 2016

(65) Prior Publication Data

US 2017/0039586 A1 Feb. 9, 2017

Related U.S. Application Data

(63) Continuation of application No. 12/714,722, filed on Mar. 1, 2010, now abandoned.

(60) Provisional application No. 61/156,684, filed on Mar. 2, 2009.

(51) Int. Cl.
| | |
|---|---|
| *G06Q 30/00* | (2012.01) |
| *G06Q 30/02* | (2012.01) |
| *G06K 7/14* | (2006.01) |
| *H04W 4/12* | (2009.01) |

(52) U.S. Cl.
CPC ....... *G06Q 30/0233* (2013.01); *G06K 7/1413* (2013.01); *G06Q 30/02* (2013.01); *G06Q 30/0224* (2013.01); *G06Q 30/0226* (2013.01); *G06Q 30/0229* (2013.01); *G06Q 30/0232* (2013.01); *G06Q 30/0236* (2013.01); *H04W 4/12* (2013.01)

(58) Field of Classification Search
CPC .................................. G06Q 30/0207–30/0277
USPC ............................................. 705/14.1–14.73
See application file for complete search history.

(56) References Cited

U.S. PATENT DOCUMENTS

| | | | | |
|---|---|---|---|---|
| 6,671,358 | B1 * | 12/2003 | Seidman | G06Q 20/04 |
| | | | | 705/26.1 |
| 7,076,444 | B1 * | 7/2006 | Baron | G06Q 30/0224 |
| | | | | 705/14.26 |
| 9,224,154 | B2 * | 12/2015 | Wesley | G06Q 20/20 |
| 2006/0195359 | A1 * | 8/2006 | Robinson | G06Q 30/02 |
| | | | | 705/14.17 |

(Continued)

FOREIGN PATENT DOCUMENTS

| | | | | |
|---|---|---|---|---|
| EP | 0923039 | A1 * | 6/1999 | ........... G06Q 20/387 |
| WO | WO-9723838 | A1 * | 7/1997 | ............. G06Q 20/12 |
| WO | WO-9730410 | A1 * | 8/1997 | ........... G06Q 20/387 |

OTHER PUBLICATIONS http://web.archive.org/web/20001109095900/www.planetu.com/pages/1a_upons.html (Year: 2000).*

*Primary Examiner* — Michael Bekerman
(74) *Attorney, Agent, or Firm* — Patent GC LLC

(57) ABSTRACT

A method for delivering customized data items to users of electronic privilege cards includes receiving a customized data item to be delivered to a user having an electronic privilege card, identifying the electronic device storing the targeted user's electronic privilege card, and transmitting the customized data item to the electronic device. In one embodiment, the data item is an offer or coupon that the user may redeem from an entity associated with the electronic privilege card, such as a retailer or service provider. In another embodiment, the electronic device storing the electronic privilege card is a mobile telephone.

11 Claims, 10 Drawing Sheets

(56) References Cited

U.S. PATENT DOCUMENTS

| | | | | |
|---|---|---|---|---|
| 2006/0247978 A1* | 11/2006 | Davis | ............... | G06Q 30/02 |
| | | | | 705/26.1 |
| 2007/0241189 A1* | 10/2007 | Slavin | ............... | G06Q 30/02 |
| | | | | 235/383 |
| 2008/0097844 A1* | 4/2008 | Hsu | ............... | G06Q 10/087 |
| | | | | 705/14.3 |
| 2008/0228565 A1* | 9/2008 | Algiene | ............ | G06Q 30/02 |
| | | | | 705/14.27 |
| 2009/0037275 A1* | 2/2009 | Pollio | ............ | G06Q 20/363 |
| | | | | 705/14.26 |
| 2010/0042517 A1* | 2/2010 | Paintin | ............ | G06Q 30/02 |
| | | | | 705/30 |

\* cited by examiner

METHOD AND SYSTEM FOR DELIVERING OFFERS TO USERS OF ELECTRONIC PRIVILEGE CARDS

CROSS-REFERENCE TO RELATED APPLICATIONS

This patent application claims priority to U.S. provisional patent application Ser. No. 61/156,684, Slavin et al., Techniques for delivering offers to users of electronic privilege cards, filed Mar. 2, 2009.

STATEMENT REGARDING FEDERALLY SPONSORED RESEARCH OR DEVELOPMENT

Not applicable.

REFERENCE TO A SEQUENCE LISTING, A TABLE, OR COMPUTER PROGRAM LISTING COMPACT DISC APPENDIX

Not applicable.

BACKGROUND OF THE INVENTION

The invention relates generally to electronic privilege cards, and more specifically to a method and system for delivering customized offers to users of electronic privilege cards. Electronic cards, in particular electronic cards that correspond to already issued non-electronic cards, are issued by a card issuing party (the card issuer) to a party to which the card issuer is granting a privilege. Such cards will be termed in the following privilege cards. Common examples of privilege cards include coupons, loyalty cards, gift cards, identification cards, credit or debit cards, membership cards, tickets, and licenses.

Electronic privilege cards ("eCards") can provide significant convenience advantages to consumers over non-electronic privilege cards ("Cards") such as easy accessibility and being more environmentally friendly than their paper and plastic counterparts. These eCards, including any associated barcodes, can be stored in an electronic version of a wallet and can be displayed on a device such as a mobile telephone that has access to the wallet. When displayed, eCards can be used with barcode readers in the same fashion as their physical counterparts.

Unlike prior art systems that either i) deliver a set of offers to mobile phone regardless of whether the phone stores an eCard, or ii) deliver identical offers to all mobile phone users, the invention describes a method of associating offers with specific privilege cards and delivering customized or unique offers to end users. Today, it is difficult and expensive for privilege card issuers to communicate with and deliver offers to their card holders outside of email and snail mail. General text alerts have also not caught on as consumers do not want spam and do not want to be inundated with text alerts.

BRIEF SUMMARY OF THE INVENTION

The invention relates to method for delivering customized data items to users of electronic privilege cards. The data items may be offers, coupons, notices regarding special events or promotions, alerts, polls, queries, news items, or any other type of information that an entity may desire to transmit. The eCards may be stored on electronic devices such as mobile phones, personal digital assistants, Blackberry® devices, iPhone® devices, or other such mobile device that has access to the internet or that may communicate wirelessly. The method includes receiving a customized data item to be delivered to a user having an eCard, identifying the electronic device storing the targeted user's eCard, and transmitting the customized data item to the electronic device. In one embodiment, the data item is an offer or coupon that the user may redeem from an entity associated with the electronic privilege card, such as a retailer or service provider.

The invention also relates to a system for delivering a data item to a user having an eCard associated with an entity. The system includes a client computer, an eCard privilege manager, an eCard server, and at least one mobile device storing an eCard associated with an entity. In one embodiment, the eCard privilege manager and eCard server are the same. The eCard server stores a data item to be delivered to a user having an eCard associated with the entity. The user stores the eCard on a mobile device. The availability of the data item is presented to the user through a first communications channel, such as a sign in a store. The user instructs the mobile device to request the data item from the eCard server. The mobile device transmits a request for the data item to the eCard server through a second communications channel, such as by text message or email. The eCard server receives the request for the data item from the user's mobile device. The eCard server then transmits the data item to the mobile device, and the mobile device receives the data item and associates the data item with the eCard. In one embodiment, the data item is an offer capable of being redeemed from the entity associated with the eCard. In another embodiment, the mobile device is a mobile telephone. In another embodiment, the eCard server may also transmit the data item of offer to a server at a given retailer who has issued the privilege card represented by the eCard and that retailer's server will be updated to note that the offer should be added to the particular Card/eCard account. Therefore when the user attempts to redeem the offer by presenting the eCard, the server knows to allow the redemption. This process is also referred to as "load to card".

In another embodiment, a user instructs the mobile device storing the user's eCard to request all data items available to the user from the eCard server. The eCard server receives the request for the available data items from the user's mobile device and determines whether it is storing any data items related to the entity associated with the eCard and customized for the user. The eCard server then transmits the available customized data item(s) to the mobile device. The mobile device receives the data item(s) and associates the data item(s) with the eCard. In one embodiment, the data item is an offer capable of being redeemed from the entity associated with the eCard and the mobile device is a mobile telephone. In one such embodiment, the mobile phone sends a text message to the eCard server requesting the data items available for the user.

One object of the present invention is to make it convenient for retailers to deliver and for consumers to obtain coupons and offers on their mobile devices, such as mobile phones. Another object of the invention is for retailers to deliver offers and coupons that are designed to be unique to individual consumers in association with a privilege card that is carried on the consumer's mobile device. The present invention is an eCard-based system that makes it easy for retailers to deliver offers/information to issued eCards.

BRIEF DESCRIPTION OF THE DRAWINGS

The invention is pointed out with particularity in the appended claims. The above and further advantages of this invention may be better understood by referring to the following description taken in conjunction with the accompanying drawings, in which:

Like reference characters in the respective drawn figures indicate corresponding parts.

DETAILED DESCRIPTION OF THE INVENTION

Figure 1:
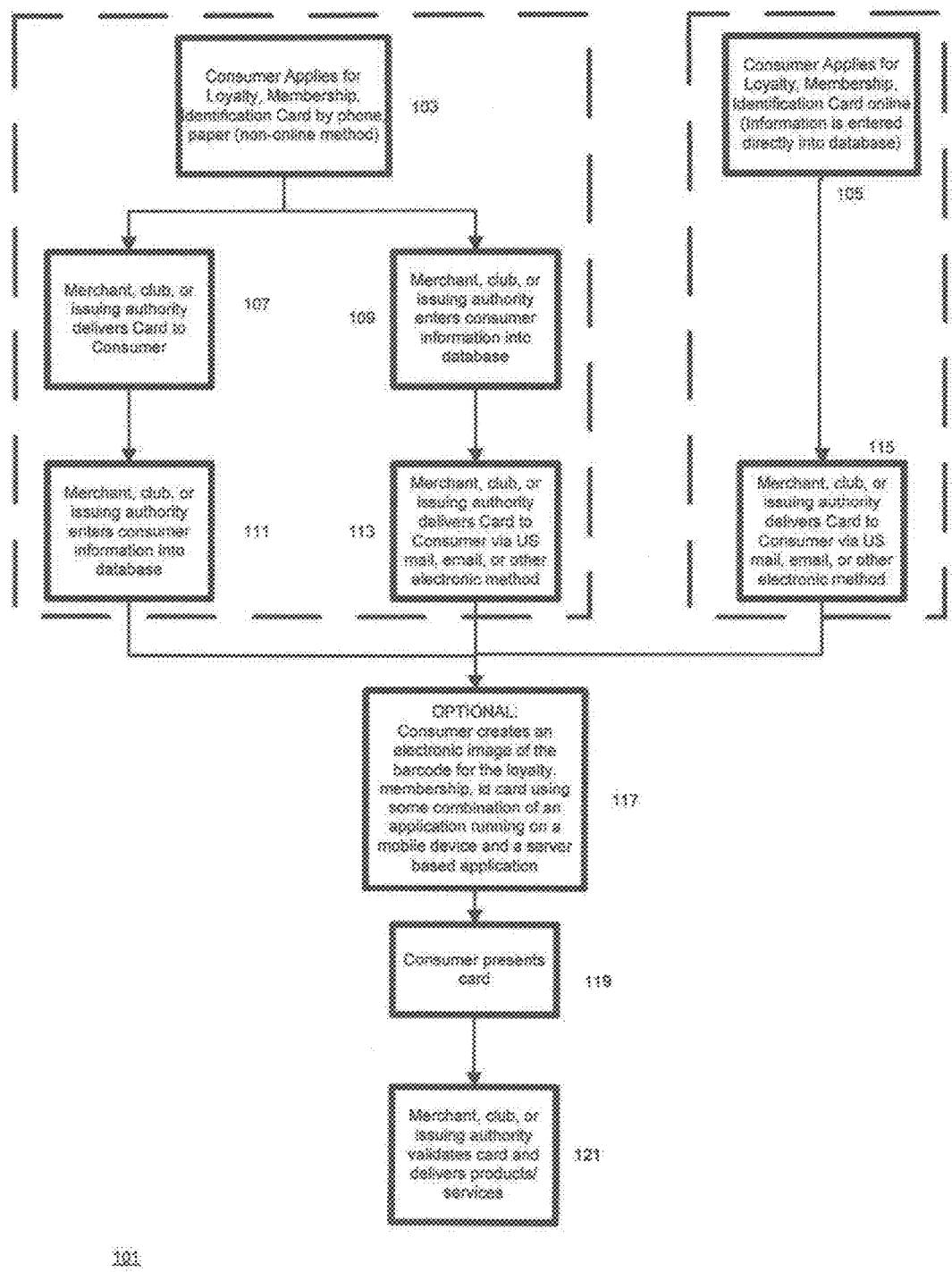
FIG. 1 is a flowchart representation of a prior art technique for providing consumers with non-electronic privilege cards and then making eCards corresponding to the non-electronic cards

FIG. 1 shows a number of ways in which today's consumer can obtain a physical Card at flowchart 101: by applying for one via a web form (105), phone (103), or paper form (103). In all cases, the issuer collects information about the applicant and enters the information into a database (111, 109, 115). The consumer obtains a physical Card either immediately or via a service such as US mail (107, 113, 115). Once the consumer has a physical copy of the card, he/she can then create an electronic version of the card (117). Currently available ways of doing this include:

Consumers fill out a form using an application running on a mobile device in which the consumer selects the type of Card from a pre-defined list and then enters the required information for that Card. The application can then present all of this information at a single time in tabular form, or place it on some type of background image to have it appear more like the original physical Card.

Consumers fill out a form using a desktop application running on a personal computer in which the consumer selects the type of card from a pre-defined list and then enters the required information for that Card. The desktop application then transfers this information to an application running on the mobile device which then presents all of this information at a single time, or places it on some type of background image to have it appear more like the original physical Card.

Consumers send a text message in to an electronic card issuing service which then transmits the electronic card to the mobile device.

Some of the above-identified methods incorporate the use/display of a barcode as part of the eCard. The eCards made as described above are stored in an electronic file or wallet for easy access by the user. To use either the physical card or the eCard made from it, the user presents the card or the image of the eCard (119) to a representative of the issuer, who validates the card and provides the privilege represented by the card (121).

All kinds of eCard versions of privilege cards have a number of advantages over physical privilege cards. For example, a consumer can carry any number of eCards in a mobile phone; and the eCards, if used as full replacements for non-electronic privilege cards, can reduce printing and delivery costs.

Privilege cards that are originally issued as eCards, that is no physical card is ever issued, have a number of additional advantages over eCards made as indicated at 117 of FIG. 1. Validation of a privilege card that is originally issued as an eCard can be automated and more kinds of validation are possible with eCards than with physical privilege cards. With eCards, validation checks can be performed when the eCard is issued and/or before/after they are to be displayed. The latter checks can determine things such as whether the eCard has expired, whether a fixed number of uses has been exceeded, whether use of the card has resulted in further privileges, or whether the eCard is being used in the proper location. An additional advantage is that eCards with automated validation can be used with clerkless point of sale systems.

A particularly effective technique for automating the validation of an eCard in a mobile device is the validity-checking wallet, described in detail in U.S. patent application publication US 2007/0241189, Slavin, et al., Using validity events to control the use of coupons containing barcodes in mobile devices that display the barcodes for reading by barcode readers, which is hereby incorporated in its entirety by reference into the present patent application. The validity checking wallet responds to validity events, i.e., events which possibly affect the validity of a card or coupon stored in the wallet. The validity-checking wallet also controls the provision of the card or coupon's barcode to a point of sale device. The validity checking wallet divides eCards and/or coupons into at least two sets; a set of the cards or coupons known to be currently valid and a set of the cards or coupons whose current validity is unknown. The wallet permits provision of a card or coupon's barcode to a point of sale system only if the card or coupon is on the list of currently valid cards or coupons. When a validity event that affects a card or coupon on the list of currently valid cards or coupons occurs, the wallet moves the card or coupon to the unknown list until the effect of the validity event on the card or coupon can be determined. If the wallet determines that the event invalidates the card or coupon, the card or coupon is discarded from the wallet or moved to a set of invalid cards or coupons; if the wallet determines that the effect of the event is that the card is valid, the card is moved to the currently valid set; if the wallet can determine neither, the card remains in the current validity unknown set.

Examples of validity events include but are not limited to providing the barcode to the POS system;
reaching the expiration date of the coupon;
providing the barcode at a particular location; and
receiving information which defines or redefines the coupon's validity, for example, new control data for a coupon.

In most cases, the validity checking wallet can make a validity determination in response to a validity event at a time other than the moment the user selects to redeem the coupon, and consequently, validation may be separated from redemption and the redemption process need not be burdened by the time required for the validation process. For further details, see FIGS. 6 and 7 of US 2007/0241189 and the discussion of those figures at [0059]-[0081] of the patent application publication.

Figure 1A:
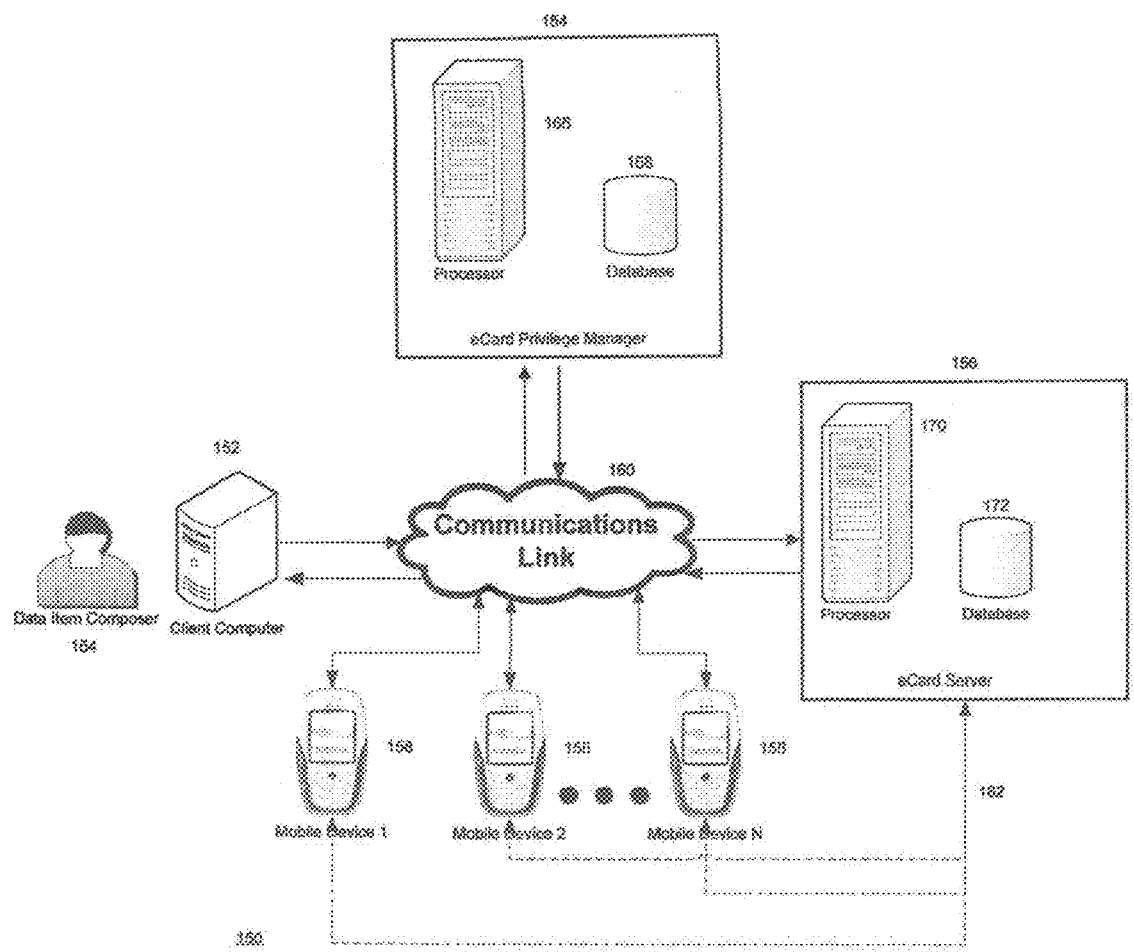
FIG. 1A is a block diagram of an embodiment of a system for generating and delivering customized data items to eCard users.

Once the eCard has been delivered to a mobile phone or other electronic device, the next step is for the retailer to generate a data item to be delivered to an eCard use. Referring to FIG. 1A and in brief overview, an embodiment of a system 150 constructed in accordance with the present invention includes a client computer 152, an eCard privilege manager 154, an eCard server 156, and mobile devices$_{1-N}$ 158. In the embodiment shown, client computer 152, eCard privilege manager 154, eCard server 156, and mobile device 158 are connected by a communications link 160. In one embodiment, the communications link 160 is a global communications network (i.e. Internet or World Wide Web). In other embodiments, the communications link 160 may be any system or group of systems by which the client computer 152, eCard privilege manager 154, eCard server 156, and mobile device 158 may communicate. For example, in one embodiment, the client computer 152, eCard privilege manager 154, and eCard server 156 may communicate via an intranet. In another embodiment, the eCard server 156 and mobile devices$_{1-N}$ 158 communicate via a mobile communications protocol 162, such as text messaging. In yet another embodiment, the eCard server 156 and mobile devices$_{1-N}$ 158 communicate via a near field communications method (NFC), such as by using radio frequency identification technology (RFID). In yet another embodiment, the mobile devices$_{1-N}$ 158 may communicate directly with the eCard privilege manager 154 via the Internet, an intranet, a NFC method, or any other communications protocol.

The client computer 152 is capable of executing a web browser. In other embodiments, the client computer 152 may also be capable of executing other applications, such as word processing, spreadsheet and email applications. The user 164 uses the web browser on the client computer 152 to access a web page hosted by the eCard privilege manager 154. The terms user, author, composer, retailer, etc. when used in connection with reference number 164 all mean the individual entering the customized data item to be sent to predetermined eCard holders. The user 164 may be a retailer that issues eCards to purchasers, or may be any other entity who issues eCards to individuals or entities that have a relationship with the issuing entity. The user may also be an individual or second entity that does not have a relationship with the first entity associated with the eCard, but desires to deliver a customized data item to one or more users having an eCard associated with the first entity. For example, Supermarket B may wish to send customized offers to consumers who have an eCard associated with Supermarket A. In one embodiment, the eCard privilege manager 154 comprises a processor 166 and a database 168. The eCard privilege manager 154 comprises tools for the user 164 to create data items that the user 164 or eCard issuer may select to deliver to individuals or entities having eCards. The eCard privilege manager 154 may be used to create data items for particular eCards, or for all eCard holders, or for a subset of all eCard holders. The data items that a user 164 may create will be discussed in more detail below. In one embodiment, the database 168 stores information regarding the eCard issuer, information regarding individuals authorized by the eCard issuer to create data items, and unique identifiers for each individual or entity having an eCard from the eCard issuer. In another embodiment, the database 168 stores information for a plurality of eCard issuers and the individuals and entities having eCards from one or more of the eCard issuers.

Figure 1B:
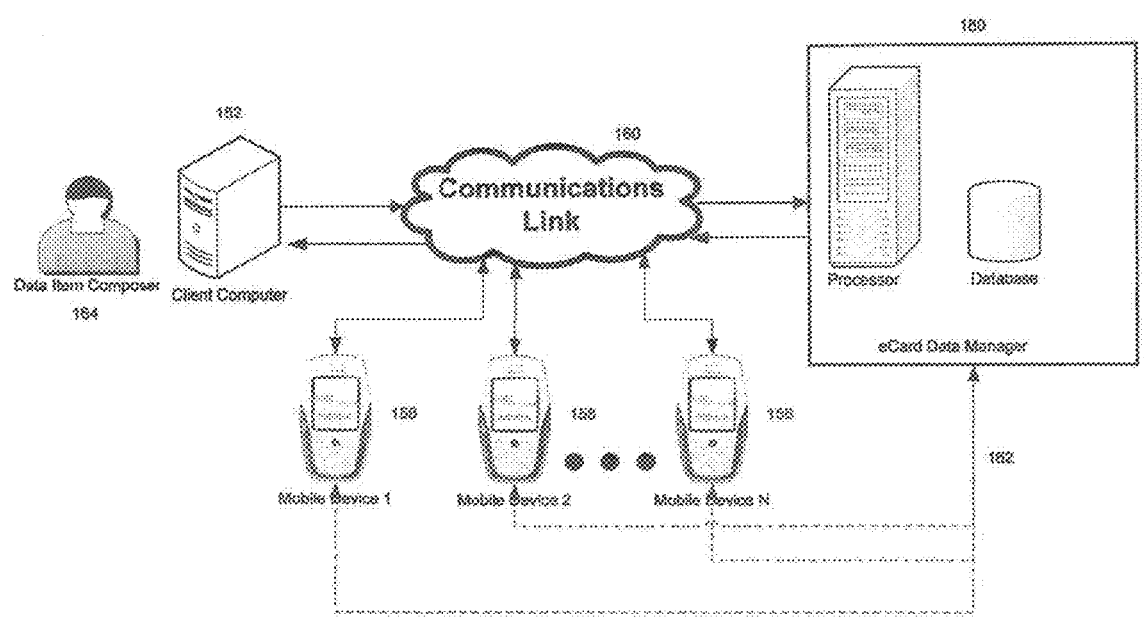
FIG. 1B is a block diagram of another embodiment of a system for generating and delivering customized data items to eCard users.

In the embodiment shown in FIG. 1A, the eCard server 156 comprises a processor 170 and a database 172. In one embodiment, the database 172 stores information for the eCard issuer and unique identifiers for each individual or entity having an eCard. The unique identifier may or may not be the same unique identifier stored by the eCard privilege manager 154. The eCard server 156 communicates with the mobile devices 158 and delivers the data items created in the eCard privilege manager 154. In one embodiment, the functions of the eCard privilege manager 154 and the eCard server 156 are performed by a single eCard data manager 180 as shown in FIG. 1B. The mobile devices$_{1-N}$ 158 may be mobile phones, personal digital assistants, Blackberry® devices, iPhone® devices, or other such mobile devices that have access to the internet or that may communicate wirelessly.

Figure 2:
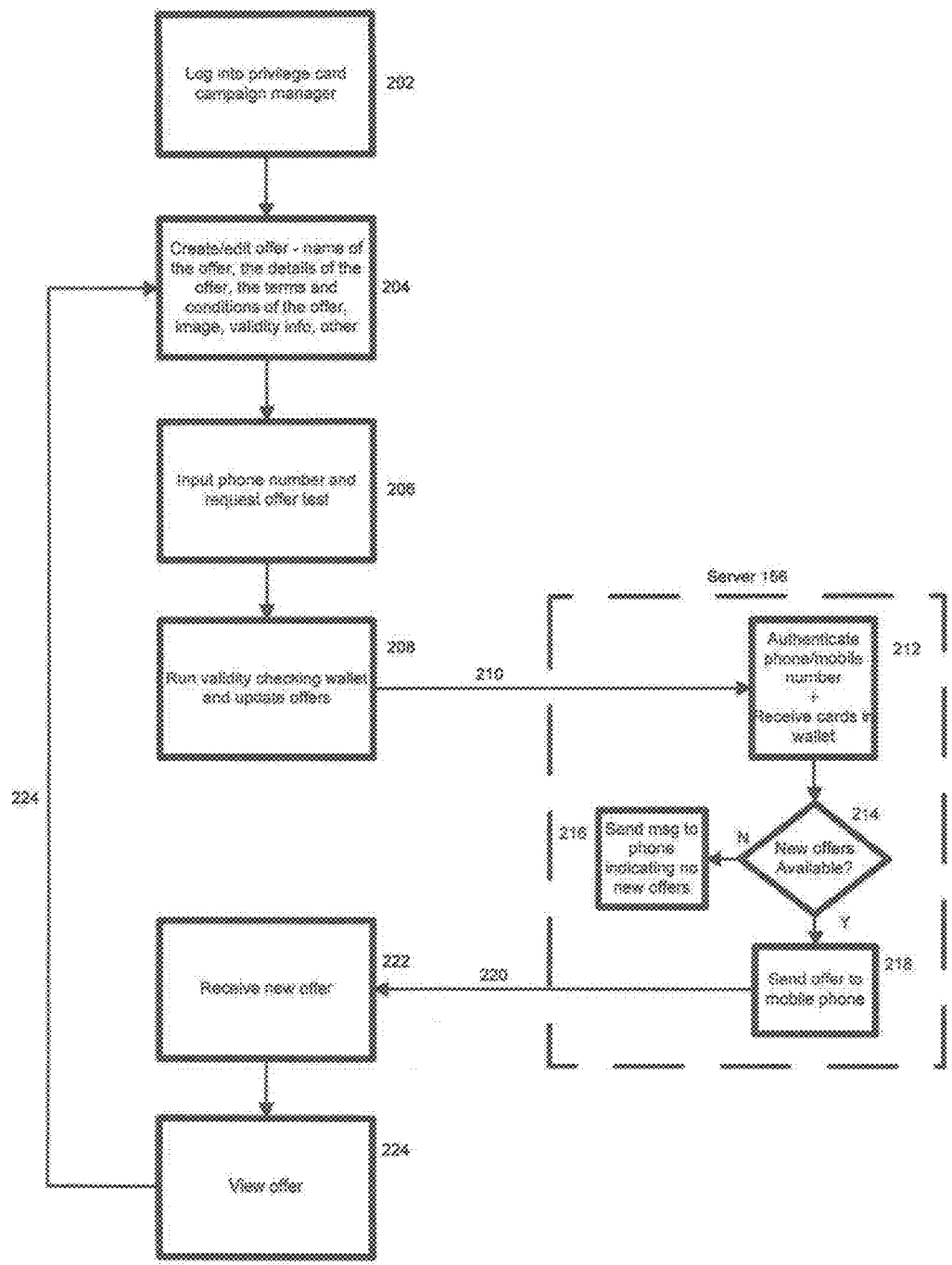
FIG. 2 is a flowchart representation of an embodiment of a process for delivering offers to users of eCards.

The operation of the system 150 is described with reference to FIG. 2. For purposes of example only, the operation of the system 150 will be described having a user 164 who is acting on behalf of a retailer and a data item which is an offer. In other embodiments, the user 164 can be any type of individual or entity who communicates data items to eCard holders. The eCard holders may have a pre-existing relationship with such individual or entity, such as customer/retailer, patient/doctor, client/service provider, member/club, etc., the eCards being associated with the individual or entity desiring to deliver a data item. In other embodiments, the eCard holders may have no pre-exiting relationship with the individual or entity desiring to communicate a data item to the eCard holders, the eCards being associated with a different individual or entity. Data items may be offers, coupons, notices regarding special events or promotions, alerts, polls, queries, news items, or any other type of information that an entity may desire to transmit. While the system 150 may be used to provision eCards to mobile devices 158, the discussion assumes that at least one eCard has previously been distributed to mobile devices$_{1-N}$ 158. At this point, the retailer 164 logs into the eCard privilege manager 154 to access their account stored in database 168, as shown at step 202 in FIG. 2. Using a standard web interface, in step 204, an offer author 164, who may be an employee of the retailer or service provider acting on behalf of the retailer, creates one or more offers in the eCard privilege manager 154 which are to be associated with the retailer's privilege card. Each offer can contain information such as the name of the offer, the details of the offer, the terms and conditions of the offer, an image which represents the product/service being offered, optionally audio or video clips associated with the offer, categories that offer falls into (such as entertainment, food, etc.) and usage validity information such as the start and expiration date of the offer and the number of times the offer can be used. Once an offer is created, it is saved in the database 168.

In one embodiment of the system 150, the retailer 164 may prepay for a predetermined quantity of offers to be delivered to mobile devices$_{1-N}$ 158. Each time an offer is delivered to a mobile device 158, a predetermined amount is deducted from the prepaid amount. Once the prepaid amount is depleted, the system 150 will discontinue delivering offers to mobile devices$_{1-N}$ 158 until additional funds are received.

In step 206, the author 164 tests offers by inputting the phone number of his/her mobile phone 158 and selects an option which instructs the system 150 to test the offer. In order to test the offer, the eCard privilege manager 154 communicates the offer and the author's identification information to the eCard server 156. Next, in step 108, the author 164 runs the validity checking wallet on his/her phone 158 and selects to update the offers in the validity checking wallet. In step 210, the validity checking wallet communicates with the eCard server 156 via http and includes information about which privilege cards are stored in the validity checking wallet and the mobile phone number of the mobile phone on which the wallet is installed.

The eCard server 156 receives this message at step 212 and then looks to see if any new offers are available for any of the privilege cards associated with this phone number at step 214. In this case, there will be a new offer available (the offer being tested) and the eCard server 156 proceeds to step 218 and transmits the newly created offer back to the validity checking wallet via http. Next in step 222, the author 164 will receive an alert from the wallet application that new offers have arrived and can then view the test offer(s) by selecting an option which with display the offer. In one embodiment, the author 164 may click on a screen icon on the author's mobile device 158 next to the logo associated with the privilege card. Clicking this icon will show the test offer along with any other existing offers for the selected eCard. In the embodiment shown in FIG. 2, the author 164 then uses the phone's cursor motion keys to highlight the test offer and then view it in step 224. If the author 164 wishes to make any changes to the offer, s/he logs back into the eCard privilege manager 154, locates the test promotion from the list of promotions, clicks edit, and makes any necessary changes. At this point, the author 164 may repeat the test process as outlined above.

It should be noted that in addition to viewing the offers after clicking on an icon next to an eCard logo, the validity checking wallet of the mobile device 158 also allows the user to view offers by category. If the offer author 164 has attached a category to the offer, then selecting such category as an option in the validity checking wallet will display all of the offers in the wallet, including the test offer, sorted by offer category.

Figure 3:
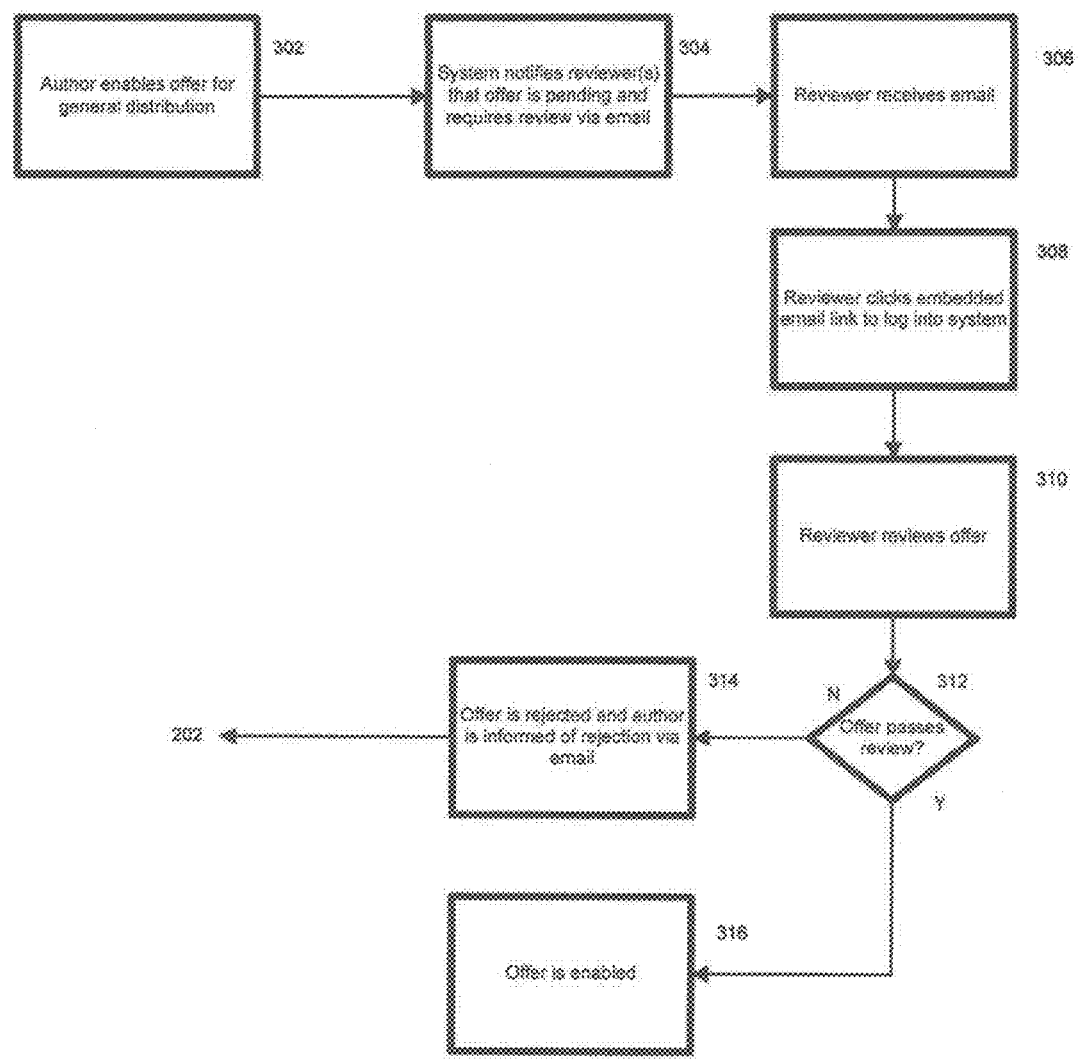
FIG. 3 is a flowchart representation of an embodiment of a process for enabling an offer for distribution to users of eCards.

In one embodiment, once the author 164 has completed his/her testing, s/he will next enable the offer for general distribution as shown at step 302 in FIG. 3. To do this, s/he will select a command presented on the client computer 152 to request that the offer be reviewed and enabled for general release. Once the author has selected this option, in one embodiment, at step 304, the system 150 will notify individuals who have been identified as reviewers that they must now review the offer(s) prior to final release. Such notifications may be done via email. When the reviewers receive the notifications at step 306, they log into the eCard privilege manager 154 at step 308. In one embodiment in which the notification is an email, the email contains an embedded link that the reviewer may select. Next in step 310, the reviewer is brought to a page where they can review the offer, send it to a validity checking wallet on their own phone using the same method the author used, and in step 312 determine whether to approve the offer. Once all of the required reviewers have approved the offer, it is enabled at step 316 and made available to the users who have the associated eCard in their validity checking wallet through the eCard server 156. If the offer is rejected, then the author 164 is informed via email at step 314 and may return to step 202 to perform further edits on the offer.

Figure 4:
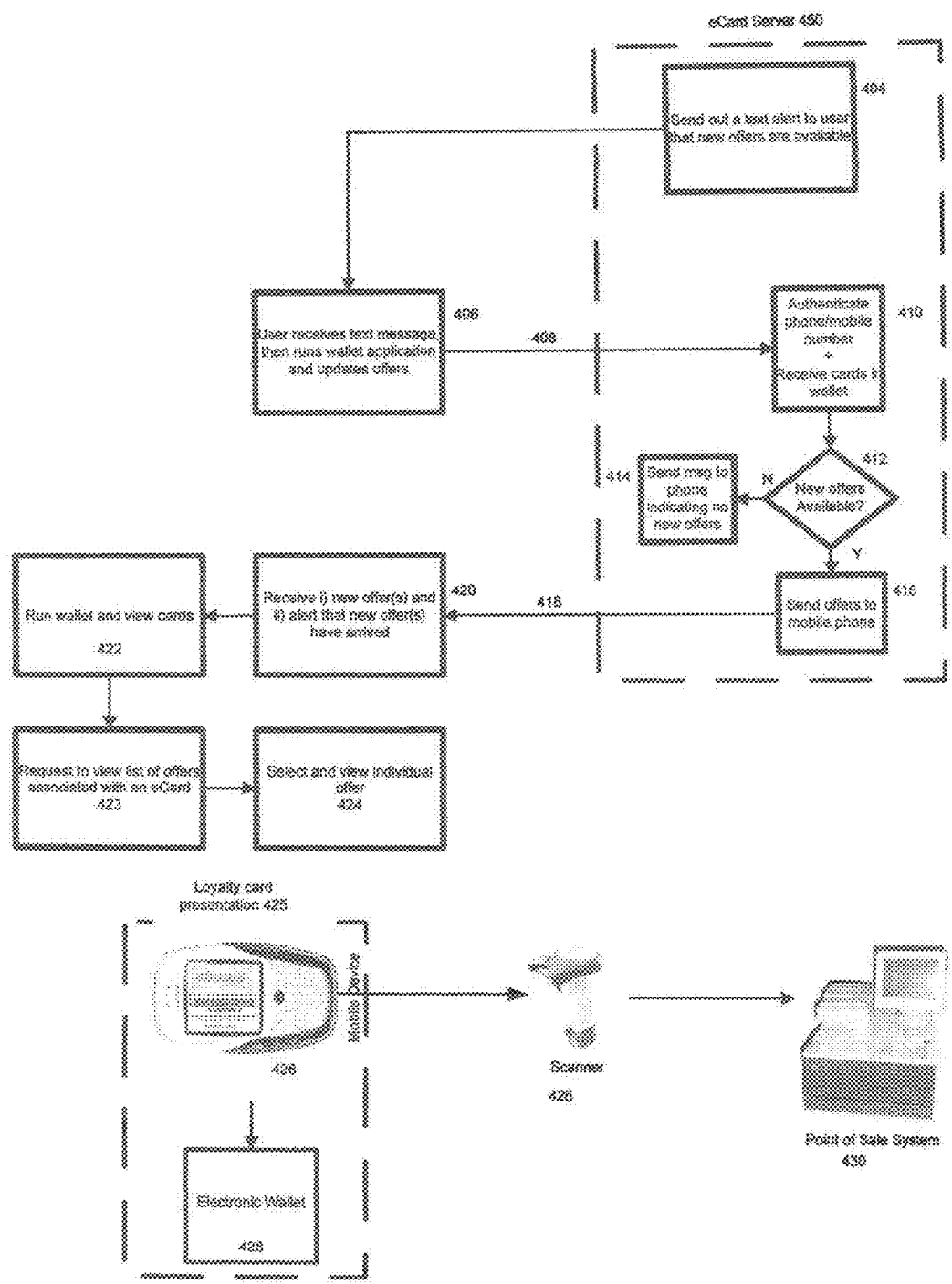
FIG. 4 is a flowchart representation of an embodiment of a process for delivering offers to users of eCards and the user redeeming the offers at a point of sale system.

Once a new offer is made available, the eCard server 156 sends out a text alert as shown at step 404 in FIG. 4 alerting the mobile devices's$_{1-N}$ 158 users that new offer(s) are waiting. In another embodiment, the system 150 is a location-based service. That is, the eCard server 156 sends a message alerting a mobile devices's$_1$ 158 user that new offer(s) are waiting upon detecting the proximity of the user to a predetermined location. For example, the eCard server 156 may send a message alerting a mobile devices's$_1$ 158 user that new offer(s) are waiting upon detecting the user entering a retailer's physical location. In one such embodiment, the offers are customized to each eCard holder, and the eCard server 156 only sends a message alerting a mobile devices's$_1$ 158 user that new offer(s) are waiting if the eCard server 156 is storing any offer(s) that are customized or personalized to that user.

The user of the mobile device 158 then runs the validity checking wallet on his/her phone and selects to update the offers in the validity checking wallet at step 406. In step 408, the validity checking wallet communicates with the eCard server 156 via http and includes information about the device on which the validity checking wallet is running such as screen dimensions or phone make/model, which eCards are stored in the validity checking wallet, and the mobile phone number of the mobile phone on which the validity checking wallet is installed. This enables the eCard server 156 to send the offer in a format that will be recognized by the user's mobile device 158.

The eCard server 156 receives this message at step 410 and looks to see if any new offers are available for any of the eCards associated with the received phone number at step 412. In this case, there will be a new offer available (the new offer(s) that have just been approved), and so that offer will be transmitted back to the validity checking wallet via http at step 416 along path 418. Next in step 420, the user will receive an alert from the validity checking wallet application that new offers have arrived. In step 422, the user can then view the offer(s) by running the wallet and viewing the list of eCards contained in the wallet and then looking for indicia next to a loyalty card logo indicating that a new offer has arrived. In one embodiment, the indicia is an icon. If the user sees an offer indication icon, in step 423 s/he clicks on the offer indication icon next to the logo associated with the privilege card. Clicking this icon will show the new offer(s) along with any other existing offers. The user then uses the phone's cursor motion keys to highlight the test offer and then view it in step 424.

To take advantage of the offers in the validity checking wallet, the user uses one of two methods:

1) In one usage case, the retailer 164 will have already associated the offers entered into the eCard privilege manager 154 with the user's privilege card. This would be done in the retailers POS system by using the various features of their POS software. In order for the user to take advantage of any of the offers associated with his/her privilege card, while the cashier is ringing up the sale, the user presents the eCard 425 by running the validity checking wallet 428 on his/her mobile phone, selecting the privilege card, and displaying the eCard 426. Once displayed, the cashier either scans the associated barcode from the eCard using scanner 428 or manually inputs the privilege card number. Once the number has been accepted by the POS system 430, the POS system 430 checks to see if any of the items purchased by the user have corresponding offers in the POS system. If there are corresponding offers, then the user receives any appropriate discounts.

2) In another usage case, the retailer 164 will have entered the offers into their POS system, but will not have associated them with a specific eCard. In order for the user to take advantage of any of the offers associated with his/her eCard, while the cashier is ringing up the sale, the user runs the validity checking wallet 428 on his/her mobile phone 158 and selects the privilege card 426 they wish to display. Once displayed, the cashier either scans the associated barcode from the eCard or manually inputs the privilege card number. Next, the user selects the offer they wish to redeem from the list of offers associated with the eCard and requests that the validity checking wallet 428 display the offer and associated barcode/offer number. The cashier then either scans the barcode from the mobile phone 158 or manually enters the offer number. Once the number has been accepted by the POS system, the POS system checks to see if any of the items purchased by the user have corresponding offers in the POS system. If there are corresponding offers, then the user receives any appropriate discounts. The POS system may optionally only accept such offers if they are used in conjunction with the eCard, meaning that if the user does not first display and have the cashier enter his/her privilege card, then the POS system will not validate the offer and the user will not receive any discounts.

In either of the above two cases, the validity checking wallet 428 will check to ensure that an offer is still valid either prior to the display of the offer or just after the display of the offer. For example, the validity checking wallet 428 might compare the start and end date of an offer with the current date on the mobile phone 158. If the current date is outside of the range of the start/end date for the offer, then the validity checking wallet 428 will not display the offer. Similarly, if the offer can only be used a limited number of times, the validity checking wallet 428 temporarily invalidates the offer and prompts the user to contact the server following the display of the offer. Use validation of this type is discussed in more detail in U.S. patent application Ser. No. 12/371,130, Slavin, et al., Techniques for providing an electronic representation of a card, filed 13 Feb. 2009. The description in U.S. patent application Ser. No. 12/371,130 is hereby incorporated in its entirety by reference into the present patent application for all purposes. While communicating with the wallet 428, the eCard server 156 communicates with the retailer's POS system in real time and determines of a particular offer is still valid for additional uses. If it is valid for additional uses, then such information is communicated to the wallet 428 and the wallet 428 will allow for another display of the offer. If the offer is no longer valid, then the wallet 428 will not re-enable the display of such offer. Alternatively, the eCard server 156 may exchange information with the retailer's point of sale system on a batch basis (once per day, for example) to determine if offers are still valid.

Figure 5:
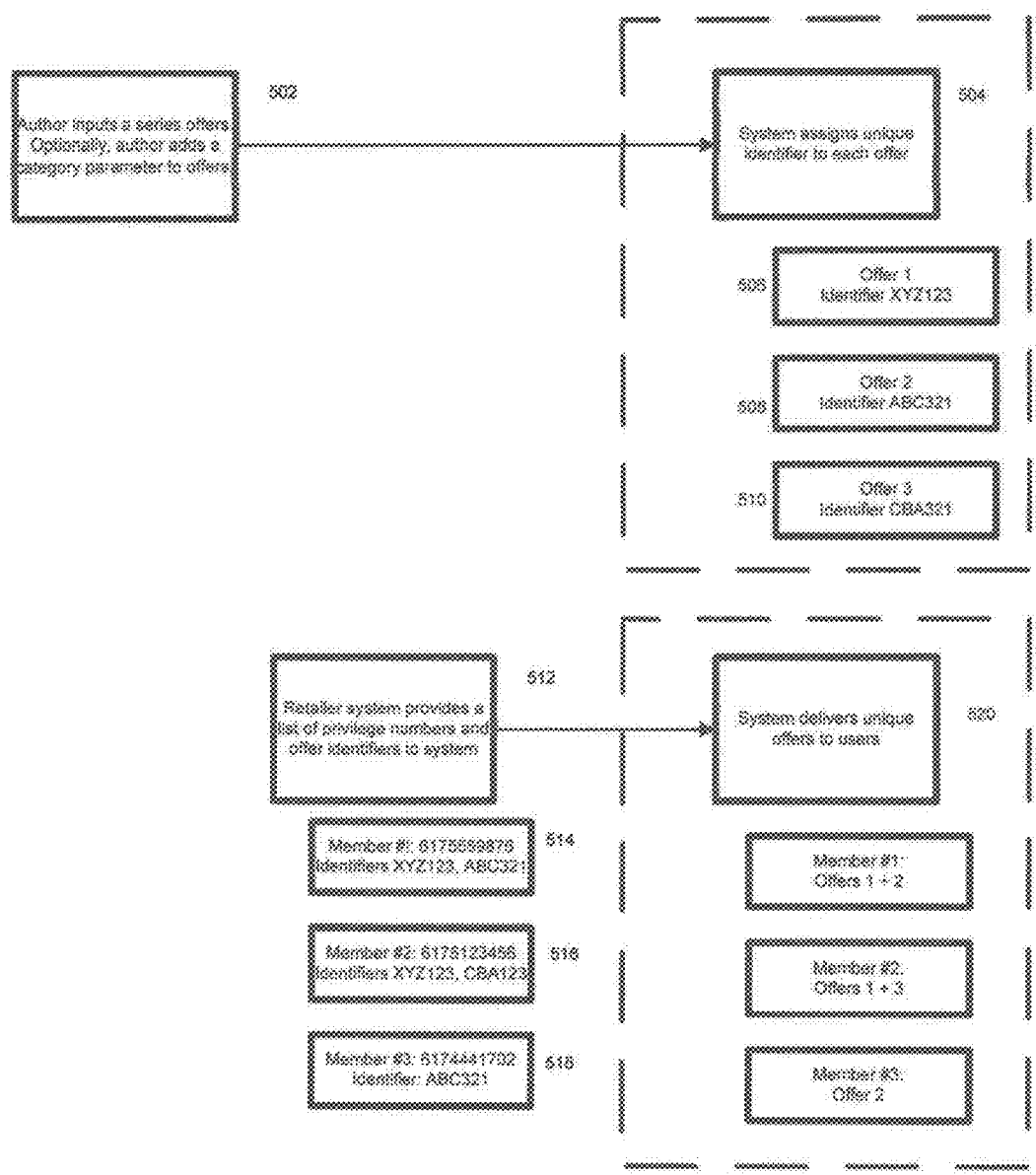
FIG. 5 is a flowchart representation of an embodiment of a process for delivering customized offers to users of eCards.

In one embodiment according to the present invention, the system 150 is able to deliver unique or customized offers to eCard users via the validity checking wallets 428 on the mobile devices 158. In one example, the offer author 164 inputs a series of offers into the eCard privilege manager 154 via the web interface on the client computer 152, as shown at step 502 in FIG. 5 or programmatically via http post using a standard program interface defined as a feature of the eCard privilege manager 154. The eCard privilege manager 154 assigns a unique identifier to each offer at step 504. As shown in FIG. 5, Offer 1 506 is assigned unique identifier XYZ123, Offer 2 508 is assigned unique identifier ABC321 and Offer 3 510 is assigned unique identifier CBA321. In one embodiment, the author 164 may assign a category such as food or entertainment for each offer. In another embodiment, any system generated identifiers are i) displayed on the screen of the web interface of client computer 152 if an author 164 is using the web interface or ii) returned to the client computer 152 via http post using the program interface when a new program is defined programmatically. When it is time to deliver offers, the merchant 164 then provides the eCard privilege manager 154 with a database of information containing privilege card numbers and the offer identifiers associated with each privilege card number at step 512. For example, blocks 514, 516 and 518 identify the unique offer identifiers associated with Member 1, Member 2 and Member 3, respectively. Such information could be provided to the system programmatically via http post or via a flat text file such as a CSV file. In step 520, the eCard server 156 then delivers only those offers to each user that are associated with that user's privilege number. In one embodiment, mobile phone number is used as the unique way to identify the users in place of privilege card number.

It should be noted that the data item composer/retailer 154 determines how to personalize or customize offers for each eCard holder or group of eCard holders. There are many analytical systems known for generating personalized or targeted ads and offers. One such system is described in US Patent Application Publication No. 2005/0289006 to Cividini et al. One purpose of these systems is to provide commercial offers that will be of interest to a particular consumer. The customization may be based on the consumer's purchase habits or tastes, or other personal information. In one embodiment of such a system, the system includes a historical archive of data related to offers already redeemed by a specific user, and/or past purchases made by the specific user. The present invention may be used to deliver the customized ads once the per-eCard customization has been determined. The present invention may also store information regarding each eCard holder. The user 164 may direct that a customized data item be delivered to all eCard holders who have a particular characteristic, such as gender, age, purchase history, user specified preferences such as baby, electronics, or home, loyalty clubs or other clubs they are members of, location, or any other characteristic that may be shared by multiple eCard holders.

Figure 7:
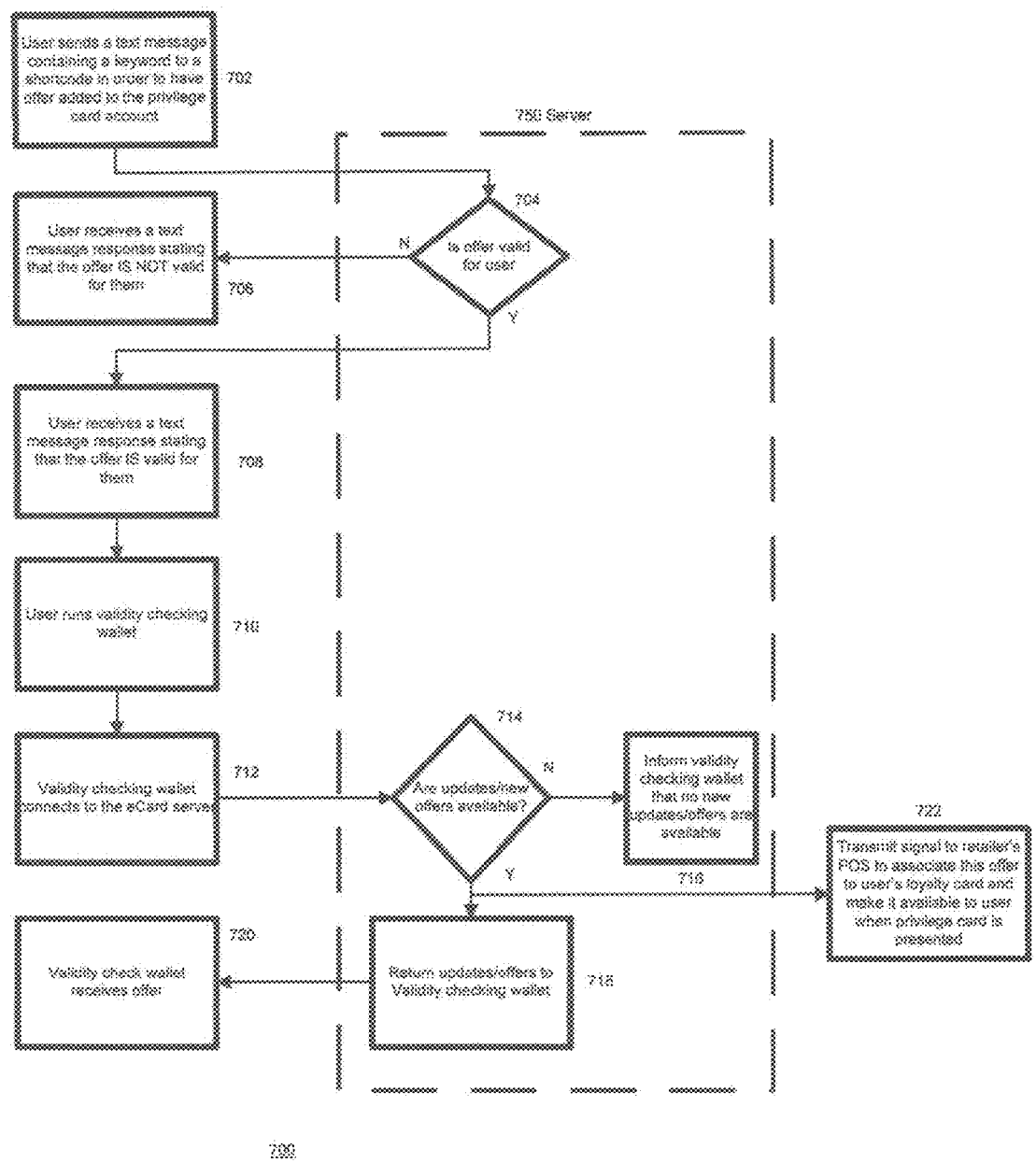
FIG. 7 is a flowchart representation of an embodiment of a process in which a user may issue a text message in order to add an offer to their validity checking wallet.

FIG. 7 shows one embodiment of a system according to the invention in which a user having an eCard may send in a text message to add an offer to their validity checking wallet. As an example, a user might see a sign at their local retailer offering a discount on a product for texting a keyword to a shortcode. By displaying a sign regarding an offer, the retailer presents the availability of an offer to an eCard holder through a first communication channel. To obtain this discount, at step 702 the user would text the keyword in to the shortcode. The server receives the text message and determines at step 704 if the offer is valid/available for that user/mobile number. If the offer is valid/available, in step 708 the user receives back a notification that the offer has been added to their privilege card. Next in step 710, the user runs the validity checking wallet, which in turn connects to the server to check for updates and then downloads this offer in step 714. See for example, blocks 718 and 720. The server thus downloads the offer to the eCard holder's mobile device via a second communication channel. Depending upon the sophistication of the merchant's POS system, the offer could be automatically loaded to the user's privilege card account in step 722 so that by simply presenting the privilege card, the user could take advantage of the offer. If the merchant's POS system was not as sophisticated, then the offer might be returned with its own unique offer identifier or barcode which could then be presented to the cashier in conjunction with the privilege card.

In another embodiment of a system according to the invention, a user having an eCard may send in a text message to add all offers available from the entity associated with a particular eCard to the user's validity checking wallet. As an example, a user might enter a physical location of retailer and desire to obtain all offers available to the user. The user may text a keyword or a shortcode to request the offers. The keyword may be associated with a location, such as store number. By texting to request the offers, the user communicates with the server through a first communication channel. The server receives the text message and determines if there are any valid/available offers for that user/mobile number. If there is at least one offer that is valid/available, the user receives back a notification that the offer has been added to their privilege card. Next, the user runs the validity checking wallet, which in turn connects to the server to check for updates and then downloads the offer(s). The server thus downloads the offer(s) to the eCard holder's mobile device via a second communication channel. In other embodiments, the first and second communications channels may be the same. Depending upon the sophistication of the merchant's POS system, the offer(s) could be automatically loaded to the user's privilege card account so that by simply presenting the privilege card, the user could take advantage of the offer. If the merchant's POS system was not as sophisticated, then the offer might be returned with its own unique offer identifier or barcode which could then be presented to the cashier in conjunction with the privilege card.

In one embodiment, once a user has elected to have an eCard on their mobile device 158, the system provides such users with a web interface to manage the preferences of one or more of the privilege cards on their mobile phone. In another embodiment, they users may access the web interface prior to having any eCards. For example, the user could start with no eCards and access the site to add eCards. The user could also add the eCards by using a mobile phone based application.

Figure 6:
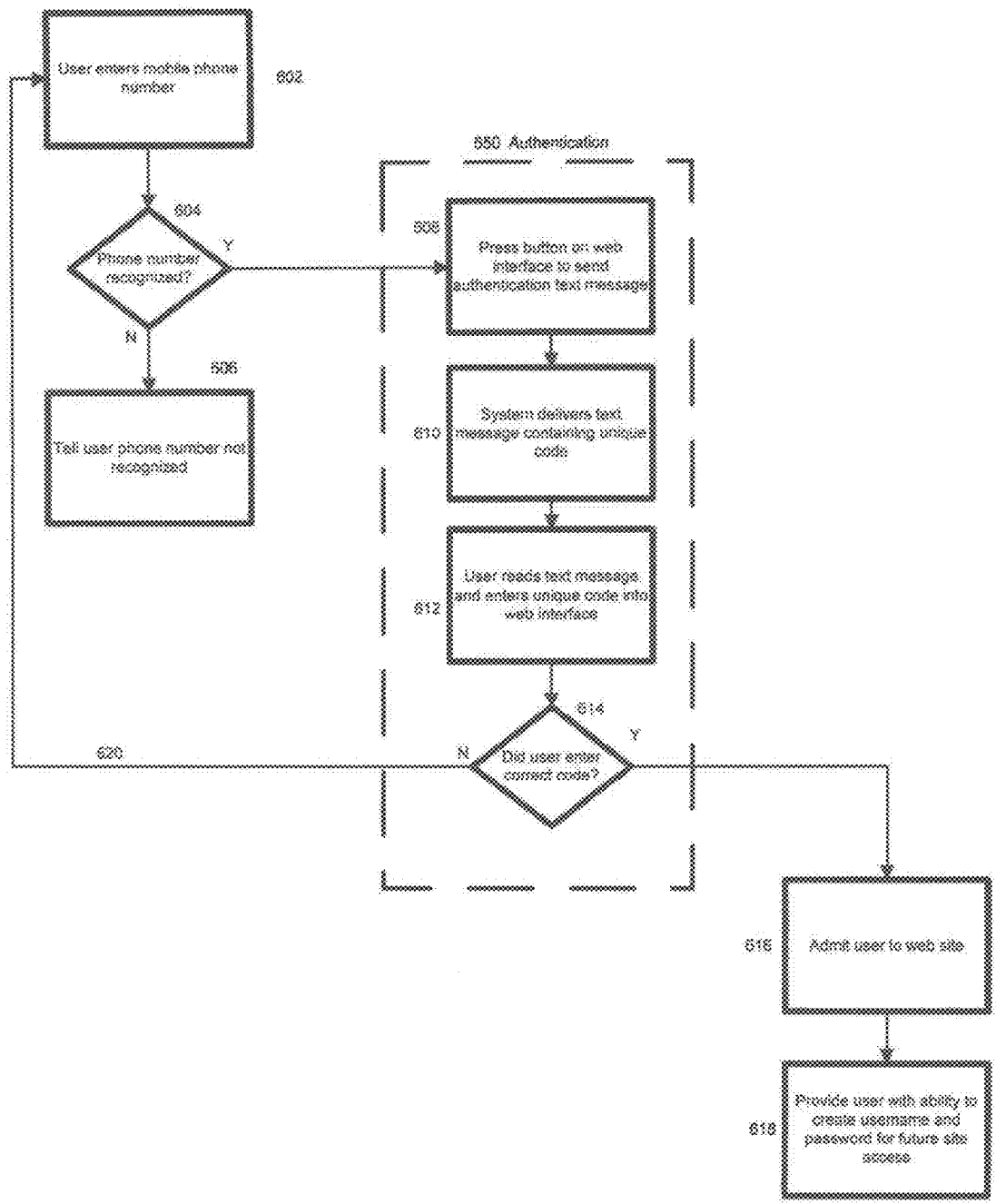
FIG. 6 is a flowchart representation of an embodiment of a process for authenticating a user.

If the user has not visited the site before, then the user enters his/her mobile phone number, as shown at step 602 in FIG. 6. If such mobile number is unrecognized, then at step 606 the user is asked to try again or to create a new account on the system. If such mobile number is recognized, then the user must be authenticated for the first time following the steps in block 650. The reason for this is that the user may have one or more eCards on their mobile phone, but not yet have a formal account on the system because they have not previously visited the web interface. In this case, at step 608 the user will press a button to send a text message to his/her mobile phone. Such message will contain a unique code as indicated at step 610. In step 612, the user then reads this code from his/her phone and enters it into the web interface. If the unique code is correct, then the user is authenticated and given access to the interface at in step 616. If not, the user is not admitted to the web interface and follows path 620 to re-enter his/her mobile phone number.

In another embodiment, the web interface presents a unique code to the end user and requests that the end user run the validity checking wallet application, enter the unique code, and then request the wallet to communicate that code to the server. If done successfully, the user is authenticated and will be granted access to the web interface. In either case, once the user has been authenticated, s/he is provided with the opportunity to access the web interface with a username and password of his/her choosing upon future visits to the web interface.

It should be noted that the methods described in steps 608, 610, and 612 are similar to the methods required to connect a first time user's mobile phone number with the validity checking wallet on his/her mobile phone. If the validity checking wallet has just been installed on the phone for the first time, the server will need to ensure that the proper phone number is assigned to the user's particular wallet because many mobile phones do not allow applications to determine the phone's mobile number. Thus, in the case where the validity checking wallet has been installed on a mobile phone prior to requesting an eCard and prior to creating an account using the web interface, there is a need to accurately and securely have the wallet learn the mobile phone number of the mobile phone. In order to do this, the wallet asks the user to enter his/her mobile phone number. The wallet then stores this number and communicates it back to the server via a first communication method such as http. The server then uses the mobile phone number to communicate a secret code back to the phone via a second communication method such as SMS/text. The user then enters the secret code into the wallet application and the wallet application communicates that code back to the server via the first communication method to confirm that it was the code corresponding to the previously sent phone number. At this point, the wallet has securely matched the phone number to the user's phone. The above methods could use an email address and email instead of a mobile phone number and SMS.

Once authenticated, the user will be able to manage privilege cards and preferences from one or more card issuers. Examples of the type of information the user can manage using the interface are: time preference for text alerts, maximum number of alerts per month, maximum number of offers for each privilege card, whether to update all cards or only individual cards when updating the validity checking wallet, which eCards to receive offers for, categories of offers desired, phone model, name, address, phone number and other personal information, username, password, and types or categories of offers the user would prefer to receive. Once the user has entered such information, s/he presses the Save button to update the information in the system. The system can then use this information to more effectively deliver offers to such user.

Figure 8:
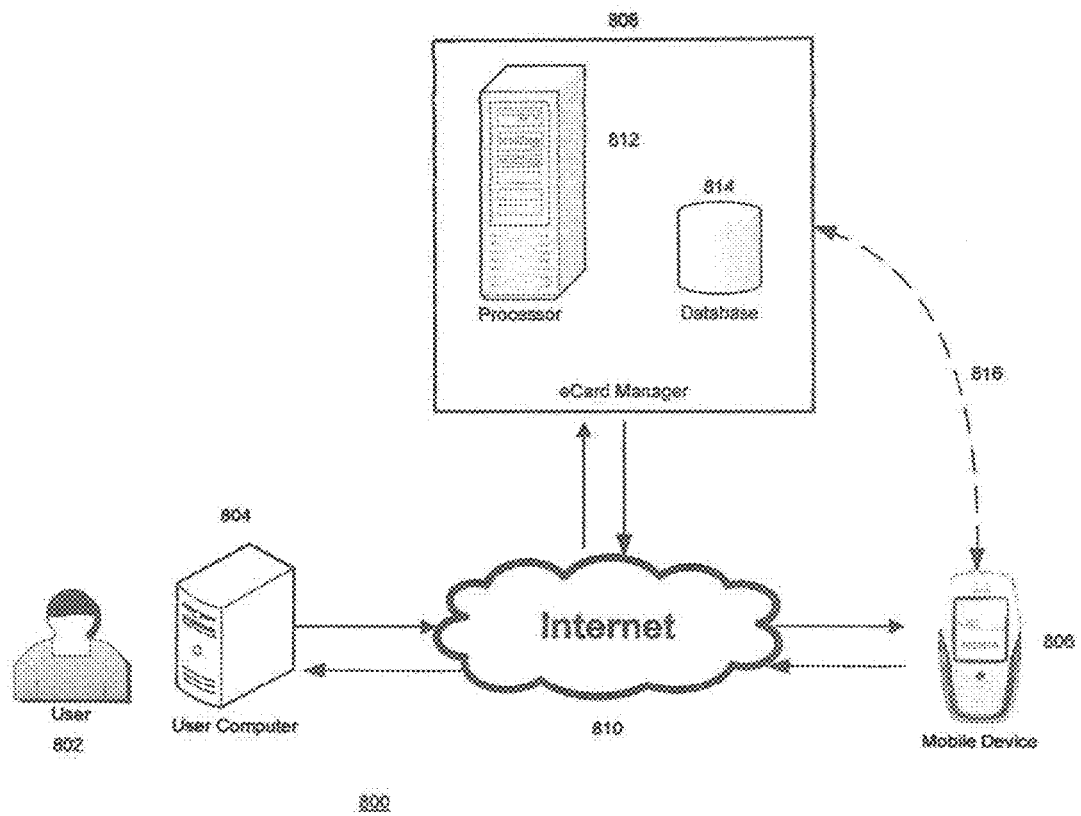
FIG. 8 is a block diagram of an embodiment of a system for allowing a user to use a web interface on a computer to manage their eCards that are stored on a mobile device.

In another embodiment, a web interface enables the user to enter new cards that s/he wishes to have delivered to the validity checking wallet as eCards and provides the ability to remove eCards from the validity checking wallet. FIG. 8 shows a block diagram of an embodiment of a system 800 for allowing a user 802 to use a web interface on a computer 804 to manage their eCards that are stored on a mobile device 806. The system 800 comprises a user computer 804, an eCard manager 808, a user's mobile device 806 and a communications link 810, such as the Internet. The eCard manager 808 comprises a processor 812 and a database 814. The database 814 stores data for all of the eCards stored on the user's mobile device 806. The user 802 may use the web interface presented on the user computer 804 to send one or more newly entered privilege cards to the validity checking wallet stored on the mobile device 806 as eCards at by selecting the appropriate command. In one embodiment, to do this, the user 802 selects an icon on the web interface displayed on the user computer 804 requesting that such new cards be delivered to the wallet stored on the mobile device 806. The eCard manager 808 then sends a message to the mobile device 806 associated with the user's web account indicating that there are new eCards available. This message could be sent via the same communication channel 810 or by a different communication channel 816 using SMS. The user 802 then runs the validity checking wallet on the mobile device 806 which connects to the eCard manager 808 and adds any new eCards to the validity checking wallet stored on the mobile device 806. The user 802 is thus able to employ the system 800 to use a web interface to manage multiple eCards which will in turn be sent to the user's phone 806. In yet another embodiment, the user may add eCards directly from the mobile device 806.

Having described various embodiments of the invention, it will now become apparent to one of skill in the art that other embodiments incorporating the concepts may be used. For example, although the contents of this document describe the application of this invention to mobile phones, it is potentially applicable to a variety of mobile devices. It is felt, therefore, that these embodiments should not be limited to the disclosed embodiments, but rather should be limited only by the spirit and scope of the following claims.

What is claimed is:

1. A method performed in a server computer residing in a communications network, the server computer including a memory and a processor, the method comprising:
   receiving, into the memory, input data comprising first data representing a plurality of offer identifiers representing one or more offers and second data representing identifiers for a plurality of targeted electronic privilege cards to receive the one or more offers, wherein the input data associates each of the offer identifiers with one or more of the identifiers of the targeted electronic privilege cards;
   receiving, from an electronic device from among a plurality of electronic devices communicatively linked to the communications network, a request to connect with the server computer;
   connecting with electronic device in response to the request;
   after connecting:
      determining whether any of the targeted electronic privilege cards is stored on the electronic device by receiving identifiers of electronic privilege cards stored on the electronic device and accessing offer identifiers from the input data as a function of the received identifiers; and
      in response to determining the electronic device stores one of the targeted electronic privilege cards to receive an offer, generating, as a function of at least the input data, one or more specific data items representing the offer which has been customized to a user associated with the targeted electronic privilege card, the one or more specific data items including the offer identifier of the offer and the identifier of the targeted electronic privilege card to receive the offer;
      transmitting the one or more specific data items, only for offers associated with the targeted electronic privilege cards determined to be on the electronic device, over the communication network from the server computer to the electronic device such that the electronic device associates the offer identifier with the electronic privilege card.

2. The method of claim 1, wherein the specific data item is an offer the electronic device user may redeem from an entity associated with the one or more targeted electronic privilege cards.

3. The method of claim 1, wherein the electronic device is a mobile telephone, the method further comprising determining a unique identifier associated with the electronic device user prior transmitting the specific data item.

4. The method of claim 3, wherein the specific data item is an offer the electronic device user may redeem from an entity associated with the one or more targeted electronic privilege cards.

5. The method of claim 3, wherein the unique identifier is selected from the group consisting of: user name, mobile device number, electronic privilege card number, and internal system identification number.

6. The method of claim 1, wherein the specific data item is capable of being displayed to the electronic device user on the electronic device.

7. The method of claim 1, wherein determining comprises:
   identifying one or more electronic privilege cards stored on the electronic device;
   determining whether any of the identified one or more electronic privilege cards stored on the electronic device is one of the targeted electronic privilege cards.

8. The method of claim 7, wherein identifying comprises accessing data for a plurality of electronic devices, the data identifying, for each electronic device, one or more electronic privilege cards stored on the electronic device.

9. The method of claim 7, wherein identifying comprises receiving data from the electronic device indicative of the electronic privilege cards stored on the electronic device.

10. A communications system comprising:
   a server computer comprising at least a processor and a memory;
   a plurality of mobile devices communicatively interconnected with the server computer by a communication network, each mobile device associated with a different user and comprising at least a processor and a memory, the memory of each mobile device including one or more electronic privilege cards for the user of the mobile device,
   the server computer being programmed to:
      receive, into the memory of the server computer, input data comprising first data representing a plurality of offer identifiers representing one or more offers and second data representing identifiers for a plurality of targeted electronic privilege cards to receive the offers, at least some of the targeted electronic privilege cards including electronic privilege cards stored among the plurality of mobile devices, wherein the input data associates each of the offer identifiers with one or more of the identifiers of the targeted electronic privilege cards;
   each mobile device being programmed to transmit a request to connect to the server computer over the communication network,
   the server computer being further programmed to, in response to receiving a request to connect from a mobile device from among the plurality of mobile devices:
      determine, by the processor of the server computer, whether any of the targeted electronic privilege cards is stored among the plurality of electronic privilege cards stored on the mobile device by receiving identifiers of electronic privilege cards stored on the electronic device and accessing offer identifiers from the input data as a function of the received identifiers;

in response to determining the mobile device stores one of the targeted electronic privilege cards to receive an offer, generate, by the processor and as a function of at least the input data, one or more specific data items representing the offer and customized for the user of the mobile device, the one or more specific data items including the offer identifier of the offer and an identifier of the targeted electronic privilege card to receive the offer; and transmit the one or more specific data items, only for offers associated with the targeted electronic privilege cards determined to be on the electronic device, over the communication network from the server computer to the mobile device; and each mobile device being programmed to, receive one or more specific data items transmitted from the server computer, and in response to receiving the one or more specific data items associate the one or more specific data items with the targeted electronic privilege card in the memory of the mobile device based on at least the identifier of the targeted electronic privilege card included in the specific data item.

11. The communications system of claim 10, wherein the server computer, to determine whether any of the targeted electronic privilege cards is stored among the plurality of electronic privilege cards stored on the mobile device, is configured to identify one or more electronic privilege cards stored on the electronic device and to determine whether any of the identified one or more electronic privilege cards stored on the electronic device is one of the targeted electronic privilege cards.

* * * * *